B. H. KENNEDY.
FOLDING CRIB.
APPLICATION FILED NOV. 12, 1917.
1,373,821.
Patented Apr. 5, 1921.
3 SHEETS—SHEET 2.
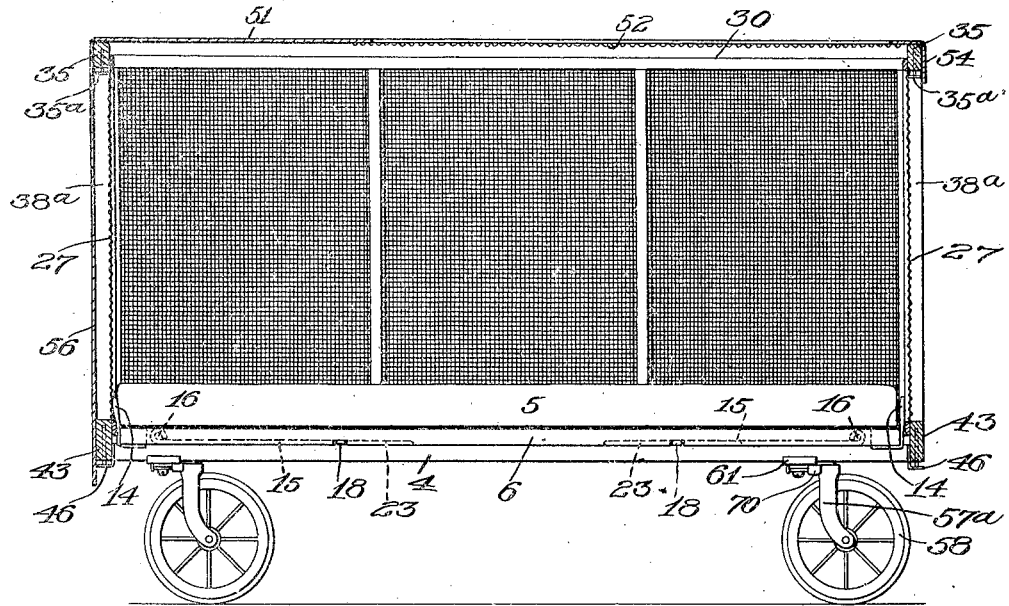
Fig.6
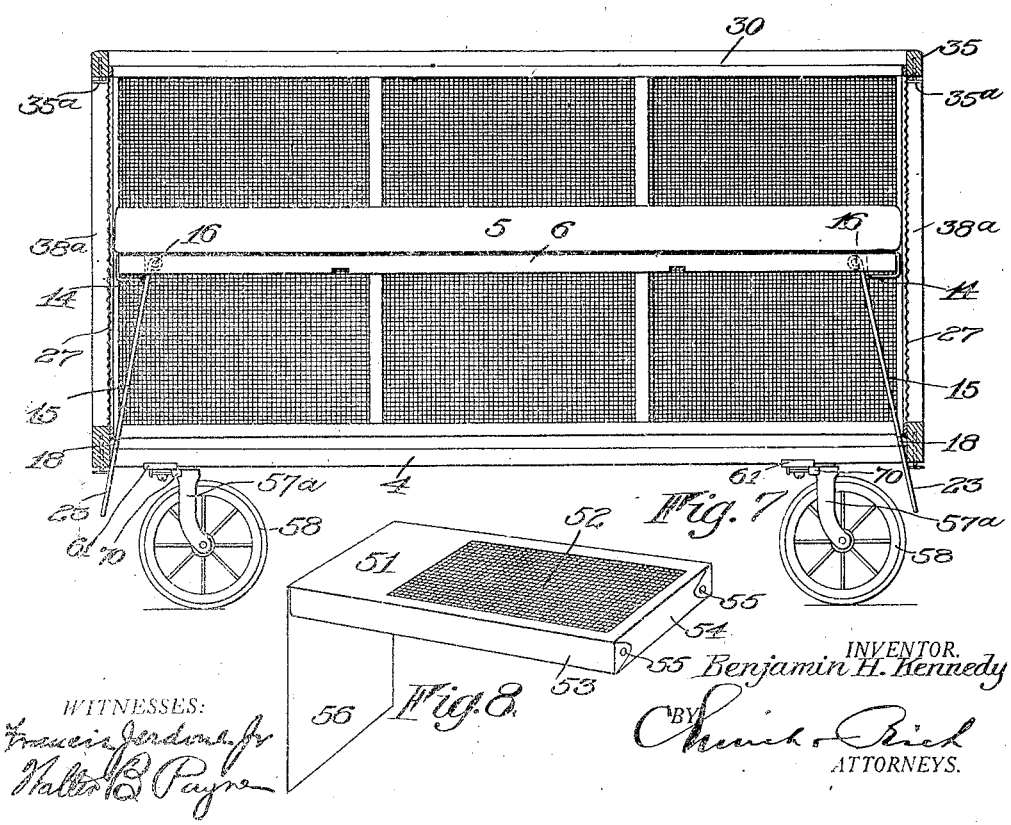
Fig.7
Fig.8
WITNESSES:
INVENTOR.
Benjamin H. Kennedy
BY
ATTORNEYS.

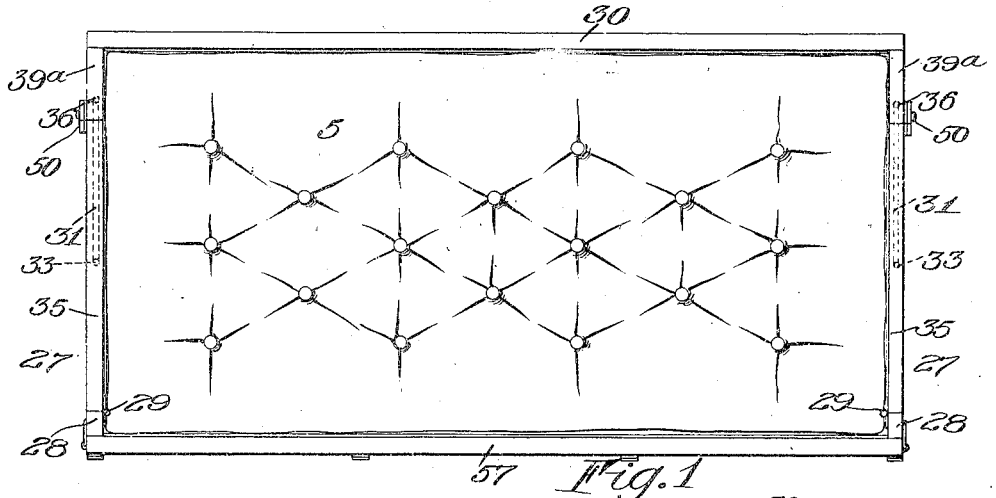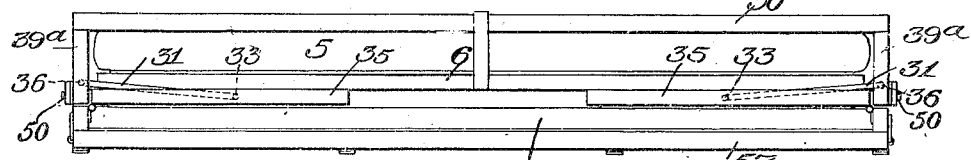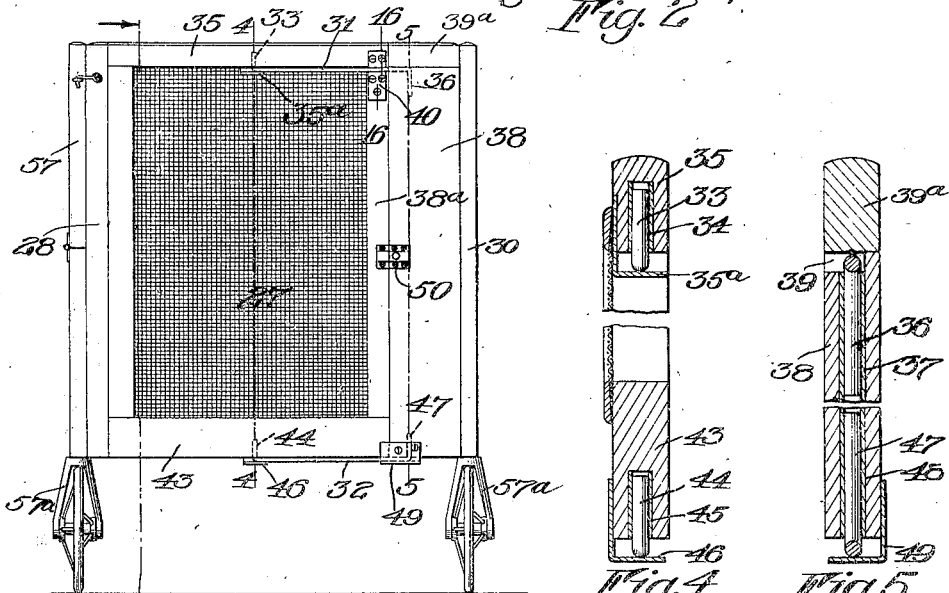

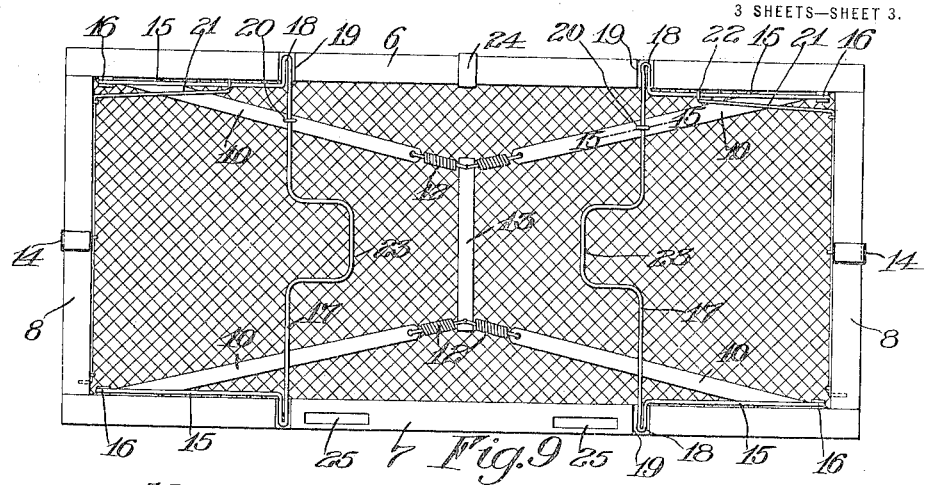
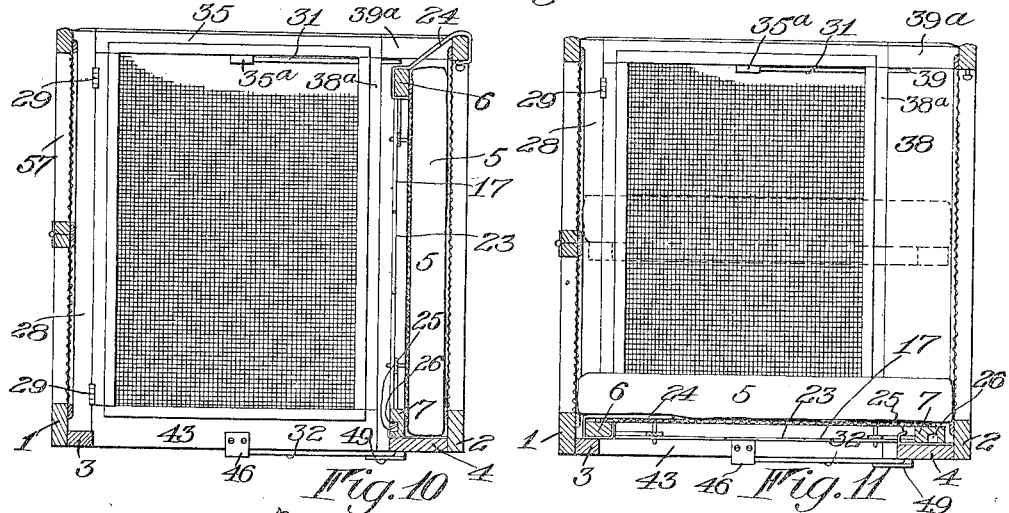
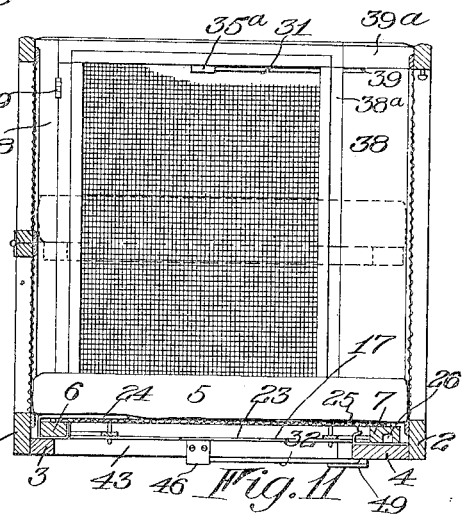
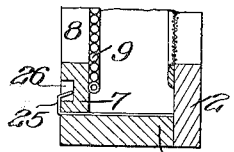
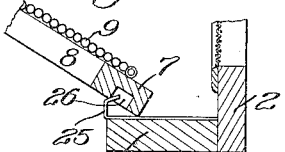
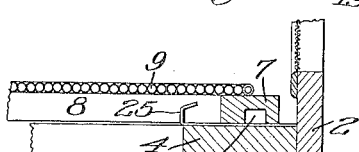
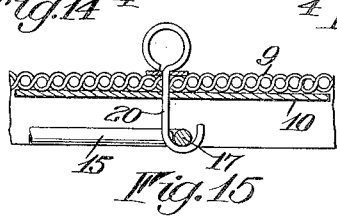
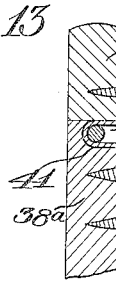

UNITED STATES PATENT OFFICE.

BENJAMIN H. KENNEDY, OF ROCHESTER, NEW YORK, ASSIGNOR, BY MESNE ASSIGNMENTS, TO BENJAMIN H. KENNEDY AND DEWEY M. KENNEDY, BOTH OF ROCHESTER, NEW YORK.

FOLDING CRIB.

1,373,821.  Specification of Letters Patent.  Patented Apr. 5, 1921.

Application filed November 12, 1917. Serial No. 201,434.

*To all whom it may concern:*

Be it known that I, BENJAMIN H. KENNEDY, of Rochester, in the county of Monroe and State of New York, have invented certain new and useful Improvements in Folding Cribs; and I do hereby declare the following to be a full, clear, and exact description of the same, reference being had to the accompanying drawings, forming a part of this specification, and to the reference characters marked thereon.

My invention relates to improvements in folding cribs and has for its object to provide means for facilitating the operation of adjusting the crib bottom to the several positions it is designed to occupy within the body, both as regards its horizontal and vertical relationship with respect thereto. A further object of the invention is to provide improved means for effecting the folding and unfolding of the crib, the construction being such that accidental displacement of the sections is prevented when they are brought to open position. A still further object of the invention is to provide an improved crib cover, designed to facilitate the ready application of the same to the crib body as well as for the purpose of screening the crib from light and insects. Still another object of the invention is to provide a novel locking mechanism for the crib casters, whereby movement of the crib in a straight line may be effected when desired. To these and other ends the invention consists in certain improvements and combinations of parts, all as will be hereinafter more fully described, the novel features being pointed out in the claims at the end of the specification.

In the drawings:

Figure 1 is a plan view of a folding crib shown in open position and embodying one form of the invention;

Fig. 2 is a similar view with the crib shown in folded position;

Fig. 3 is an end elevation of the crib shown in Fig. 1;

Fig. 4 is an enlarged detail sectional view taken on line 4—4 of Fig. 3;

Fig. 5 is a similar view taken on line 5—5 of Fig. 3;

Fig. 6 is a longitudinal sectional elevation through the crib with the bottom shown in its lowermost position;

Fig. 7 is a similar view showing the manner of supporting the bottom in an elevated position;

Fig. 8 is a view in perspective of a cover for the crib shown also in section in Fig. 6;

Fig. 9 is an inverted plan of the crib bottom showing the adjustable supports therefor;

Fig. 10 is a transverse sectional elevation through the crib body with the bottom moved from a horizontal to a vertical position;

Fig. 11 is a similar view with the bottom shown in its lowermost horizontal position;

Figs. 12 to 14 inclusive are enlarged detail sectional views illustrating the rear rail or stationary bed support and the retaining means for the bed frame with the latter shown in horizontal, partially elevated and vertical positions;

Fig. 15 is an enlarged detail sectional view taken on line 15—15 of Fig. 9;

Fig. 16 is an enlarged detail sectional view taken on line 16—16 of Fig. 3.

Similar reference characters throughout the several views indicate the same parts.

Heretofore in the construction of folding cribs, so far as I am aware, there has been no means provided for automatically operating the parts for supporting the bottom or bed-frame and mattress in raised or elevated position when it is desired to adjust the same to relatively different heights. This and other novel features are embodied in the present invention including the improved pivotal link mechanism between the two relatively movable sections or sides of the crib.

Referring to the drawings, 1 and 2 represent the lower frame members of the front and rear side sections of the crib respectively, to which are attached the bed slats or rails 3 and 4, as best shown in Figs. 10 and 11. The bed-frame for carrying the mattress 5 is composed of the front and rear rails 6 and 7 respectively, connected by the end rails 8, all of which serve to support the springs 9 as best shown in Figs. 12 to 14 inclusive. The springs 9 are supported additionally by the convergently arranged bars 10 having their outer ends preferably connected with the rails 6 and 7 and provided at their inner ends with the coil springs 12 anchored upon the transverse bar 13, as shown in Fig. 9. The end rail or frame members 8 are provided with suitable straps 14 by which each end of the bed-frame and mattress may be lifted when desired to the position indicated in Fig. 7 and by dotted lines in Fig. 11. The means for holding the bed-frame in this position of adjustment is preferably carried by the frame itself, as indicated in Fig. 9, and comprises the supports formed of legs 15 pivoted at 16 and connected by the transverse member 17, preferably formed integral with the legs as indicated by the angular loop portions 18 which normally rest in the notches 19 of the side frame members 6 and 7. The pivotal supports are normally held in horizontal position, as shown in Figs. 9 and 15 by the guards 20, preferably comprising hook-bolts, which are extended through and rotatable in the spring supporting bars 10 and which may be moved to release position by pressing down on the springs 9 at this point until the hooked portion of the bolt disengages the transverse portion 17 of the support. As the ends of the mattress or bed-frame are raised the torsion springs 21 automatically move the supports to the position shown in Fig. 7, the angular portions 18 of the legs traveling all the while on the side rails 3 and 4 until they reach and are estopped preferably by the lower end frame members of the crib. In this position the pivoted supports are slightly inclined as shown in Fig. 7 and serve to hold the bed or mattress frame in a more or less rigid position within the crib. The torsion springs 21 are suitably anchored upon the end frame members 8 preferably as shown in Fig. 9, and their free ends 22 are loosely connected with and movable upon the pivoted legs 15 of the support. The leg connecting portions 17 of the supports are each provided with a centrally disposed offset portion 23, preferably a U-shaped bend which when the supports are in the position shown in Fig. 7 project below the crib in order that they may be engaged by the foot of the attendant to be moved inwardly when it is desired to lower the mattress and frame to the bottom of the crib. When it becomes necessary to move the mattress and frame from the position shown in Fig. 11 to that shown in Fig. 10 or from a horizontal to a vertical position the attendant, by pulling up on the strap 24 at the front side of the frame moves the latter through an angle of ninety degrees, during which time the frame is also pulled forwardly until the hooks or bracket projections 25 engage the rear frame member 7 within the recesses 26 as shown in Fig. 14, thereby preventing the displacement of the frame from the supporting rail or ledge 4 at the bottom of the crib.

In providing means for effecting a folding and unfolding of the crib the non-collapsible inwardly folding sections or panels 27 thereof are hinged preferably to the uprights or corner posts 28 as indicated at 29 in Fig. 1. The folding end sections 27 are connected with the rear side sections 30 by means of the top and bottom links 31 and 32 respectively, as shown in Fig. 3. The top link 31 is provided with an upstanding angular portion 33 journaled in the bearing 34 seated in the upper end rail 35, of the folding section 27, the link at this point being held in position by the bracket 35ᵃ, as shown in Figs. 3 and 4. The opposite end of the link is turned downwardly at 36 into the bearing 37 seated in the upper end of the fixed post or upright 38 which is notched at 39 to permit said link to swing inwardly to the position shown in Fig. 2. A cap 39ᵃ is provided as a cover for the top of the post 38 as well as for the purpose of holding the rear end of the link 31 in proper position upon said post. At the point where the link 31 intersects the upright frame piece 38ᵃ of the hinged end section 27 a connection 40 is provided between said frame piece and the top rail 35, the connection being depressed or offset at 41 to form a recess 42 in which the link 31 normally rests when the crib is in the position shown in Fig. 1. The link with the crib in this position lies immediately under the frame member 35 and is therefore, hidden from view and consequently does not present an unsightly appearance.

The bottom link 32 lies beneath the frame member 43 and the upturned front end 44 thereof is journaled in the bearing 45, and held therein by the bracket 46, as shown in Fig. 4. The rear end of the link 32 is also upturned as shown at 47 and is journaled in the bearing 48 seated in the bottom end of the upright 38 and is supported by the bracket 49, as shown in Figs. 3 and 5.

A latch 50 is provided for preventing accidental displacement of the folding end sections of the crib when in normal position as shown in Figs. 1 and 3.

The cover 51 shown in Fig. 8, is adapted to be readily applied to the crib as shown in Fig. 6 and is provided for a portion of its length with a screen 52 to insure proper ventilation. The flexible side flaps 53 of the cover when the latter is applied to the crib are connected with the end flaps 54 preferably by means of the snap buttons 55 as shown in Fig. 8, said flaps being adapted to extend downwardly in engagement with the outer walls of the crib, whereby displacement of the cover is prevented. The cover is provided with a downwardly extending curtain 56 serving as a light screen as well as preventing air currents from passing through the crib when the curtained end thereof is positioned adjacent an open door or window. The upper half of the front side of the crib is provided with a hinged section 57 which may be folded down when the bed is in the position shown in Fig. 7 to facilitate the care and handling of the infant.

I claim as my invention:

1. A crib comprising a body, an adjustable bottom upon the body and means movable automatically to sustain one end of the bottom at a relatively higher point upon the body than the other when said end is raised.

2. A crib comprising a body, an adjustable bottom upon the body, a support movable automatically to sustain one end of the bottom at a predetermined height upon the body when said end is raised and a projection upon the support serving as a means by which the latter may be manually operated to return said support to normal position, whereby said bottom may be lowered.

3. A crib comprising a body, an adjustable bottom upon the body, supports pivoted upon the bottom at each side thereof, means connecting the supports transversely of the bottom, locking means normally holding said supports in a position substantially parallel with the bottom, and means adapted when said locking means is released to move the supports into position to sustain the bottom upon the body when said bottom is raised.

4. A crib comprising a body, an adjustable bottom upon the body, supports pivoted upon the bottom at each side thereof, means connecting the supports transversely of the bottom comprising a rod having a U-shaped bend projecting downwardly therefrom when the supports are in position to hold the bottom in an elevated position, said bend serving as a means by which the supports may be manually operated to return them to normal position and means for moving the supports into position to sustain the bottom upon the body when said bottom is raised.

5. A crib comprising a body, an adjustable bottom upon the body, a pivoted support upon the bottom normally extending substantially parallel therewith, and a spring adapted to move the support into position to sustain the bottom upon the body when said bottom is raised.

6. A crib comprising a body having oppositely positioned rails adjacent the bottom thereof, a frame normally resting upon said rails, supports pivoted upon the frame and means adapted to cause the supports to travel upon the rails into position to sustain the frame thereon when the latter is raised.

7. A crib comprising a body having oppositely positioned rails adjacent the bottom thereof, a frame normally resting upon said rails, transversely connected supports pivoted at the sides of the frame and normally extending substantially parallel therewith and means adapted to move the supports into sustaining position beneath the frame when the latter is raised.

8. A crib comprising a body having oppositely positioned rails adjacent the bottom thereof, a frame normally resting upon said rails, supports pivotally mounted upon the frame provided with angular extensions and means adapted to cause said angular extensions to travel upon the rails whereby the supports will be moved into position to sustain the frame when the latter is raised.

9. A crib comprising a body having oppositely positioned rails adjacent the bottom thereof, a frame normally resting upon said rails, spaced supports pivotally mounted upon the frame and provided with angular extensions, means connecting the angular extension of one support with that of the other, and means adapted to cause said extensions to travel upon the rails whereby the supports will be moved into position to sustain the frame when the latter is raised.

10. A crib comprising a body having a rail positioned adjacent the bottom of one of the sides of the crib, a horizontally disposed frame resting upon said rail and having a recess formed in the side thereof overlying said rail and means upon the rail arranged to extend into said recess to prevent displacement of the frame when the same is moved from a horizontal to a vertical position, said rail serving to support said frame in spaced vertical relation to the side of the crib body adjacent to which the rail is mounted.

11. A crib comprising a body having a rail or its equivalent mounted adjacent the bottom of one of the sides of the crib, a horizontally disposed frame resting upon said rail and having recesses formed in the side thereof overlying said rail and hook-shaped brackets upon the rail arranged to extend into said recesses to prevent displacement of the frame when the same is moved from a horizontal to a vertical position.

12. In a folding crib, the combination with two vertical, relatively movable side sections, of end panels hinged to the ends of one section, and links pivoted to the ends of the other section having vertically extending ends engaging sockets in the end panels intermediate the lengths of the panels and means for retaining said ends in the sockets.

13. In a folding crib, the combination with the relatively movable sections, of an end panel hinged to one of them at one end and having downwardly opening, alined sockets intermediate its length and between its faces, and links pivoted to one of the sections having upwardly extending portions entering said sockets.

14. In a folding crib, the combination with two side sections having a parallel folding movement, of two end panels each hinged to the end of one section and detachably interlocking with the other and comprising a frame and a link pivoted to the last mentioned side section at one end and to the under side of the top rail of the end panel at the other.

15. In a folding crib, the combination with two side sections having a parallel folding movement, the ends of one section being fitted with rigid upright end posts, of two end panels each hinged to an end of the other section and detachably interlocking with the first section and comprising a frame, and a link pivoted to each post at one end and to the under side of the top rail of the end panel at the other, the adjoining side rails of said end panel and the post being recessed in each instance to receive the link in a position between the faces thereof.

16. In a folding crib, the combination with two side sections having a parallel folding movement, the ends of one section being fitted with rigid upright end posts, of two end panels each hinged to an end of the other section and detachably interlocking with the first section and comprising a frame, and a link pivoted to the under side of each post at one end and to the end panel at the other, and a retaining plate on the lower end of the post for holding the link in its pivot bearing therein.

17. In a folding crib, the combination with two side sections having a parallel folding movement, the ends of one section being fitted with rigid upright end posts having vertical bores therein at one end and transverse channels communicating therewith, of two end panels each hinged to an end of the other section and detachably interlocking with the first section, a link pivotally engaging each post at one end in the bore thereof and lying in the channel, said link being pivoted to the end panel at the other, and a cover block on each post operating to close the bore and retain the link pivot therein.

18. In a folding crib, the combination with two side sections having a parallel folding movement, of two end panels each hinged at one side to the end of one section and detachably interlocking at the other side with the other section, and a link pivotally connected to the last mentioned section and to an intermediate portion of each end panel at its respective ends, one such end of the link being provided with a portion bent at right angles from the pivot and the connected member with a vertical bore between its side faces constituting a long bearing for said pivot.

19. A crib comprising in combination a body having oppositely positioned rails adjacent to the bottom thereof, a frame normally resting on said rails, normally folded supports pivoted upon the frame, and means adapted to cause the supports to travel upon the rails into position to sustain the frame thereon when the latter is raised, said supports comprising substantially U-shaped wire bails having intermediate offset portions accessible beneath the crib to effect their manual release by means of the operator's foot.

BENJAMIN H. KENNEDY.